United States Patent [19]
Larson

[11] 3,771,980

[45] *Nov. 13, 1973

[54] ANTI-ICING GASOLINE COMPOSITION

[75] Inventor: Arthur Lee Larson, Denver, Colo.

[73] Assignee: Marathon Oil Company, Findlay, Ohio

[ * ] Notice: The portion of the term of this patent subsequent to Feb. 1, 1989, has been disclaimed.

[22] Filed: May 26, 1971

[21] Appl. No.: 147,152

Related U.S. Application Data

[63] Continuation-in-part of Ser. No. 780,573, Dec. 2, 1968, Pat. No. 3,639,110.

[52] U.S. Cl.................. 44/72, 44/DIG. 1, 44/DIG. 4
[51] Int. Cl................................................. C10l 1/26
[58] Field of Search.................... 44/DIG. 1, DIG. 4, 44/72

[56] References Cited
UNITED STATES PATENTS
3,639,110   2/1972   Larson..................................... 44/72

Primary Examiner—Daniel E. Wyman
Assistant Examiner—Mrs. Y. H. Smith
Attorney—Joseph C. Herring, Jack L. Hummel and Richard C. Willson, Jr.

[57] ABSTRACT

Improved anti-icing characteristics of gasoline are obtained by incorporating within the gasoline stock about 0.0001 to about 1.5 weight percent of the reaction product obtained by reacting an N-secondary-alkyl trimethylene diamine (e.g. can contain 10–20 carbon atoms in the alkyl group) and a phosphate ester obtained, e.g. by reacting preferably equal molar amounts of polyphosphoric acid and a condensation product of an alcohol (contains three to five carbon atoms) and 1–10 moles of ehtylene oxide. The reaction product preferably has a pH of about 7 to 8.

12 Claims, No Drawings

ANTI-ICING GASOLINE COMPOSITION

CROSS REFERENCE TO RELATED APPLICATIONS

This is a continuation-in-part of copending patent application titled "Detergent Gasoline Composition" identified as U. S. Ser. No. 780,573, filed Dec. 2, 1968 now U.S. Pat. No. 3,639,110.

BACKGROUND OF THE INVENTION

1. Field of the Invention

This invention relates to gasolines and more specifically to anti-icing additives for gasolines. These additives reduce substantially gas line freeze-up as well as reducing icing conditions in the throttle plate area of the carburetors.

2. Description of the Prior Art

Engine stalling due to carburetor icing is a severe problem during the fall and winter of cold regions having humid conditions. Adiabatic expansion of the air/fuel mixture in the carburetor lowers the temperature of the incoming air and causes the moisture in the air to condense into droplets and freeze on chilled carburetor surfaces, e.g. the throttle plate of the carburetor. When the engine is idling, the throttle plate is almost completely closed and in such condition, ice forming on the throttle plate can bridge the gap between the walls of the carburetor and the throttle plate, thus cutting off the air supply and causing the engine to stall. Such usually occurs prior to engine warm-up.

The prior art has anti-icing agents to prevent this from occurring; the mechanism generally taught by these anti-icing agents is that of a solvent or a surfactant. Solvents generally act as an anti-freeze, i.e. it reduces ice formation by lowering the freezing point of the water vapor in the air. Surfactants tend to adhere to the carburetor surfaces when the ice particles are formed, the adhered surfactants prevent the ice particles from sticking to and building up on the metal carburetor surfaces.

As gas line anti-freezing agents, water tends to accumulate in the lower portion of the gas line and, at sub-freezing temperatures, the water forms crystals, thus plugging the gas line. The prior art has incorporated additives which will suspend water in the gasoline, e.g. isopropyl alcohol, to keep the water from forming in the lower portions of the gas line.

Examples of prior art compositions are taught in U.S. Pat. No. 3,425,815 to Rosenwald et al wherein they teach a deicing composition containing synergistic amounts of a phosphate salt of an N-alkyl-diaminoalkane and a phosphate salt of an alkyl monoamine. U. S. Pat. No. 3,436,195 to Rosenwald et al teaches a synergistic anti-icing composition containing 1) a phosphate salt of an N-alkyl-diamino-alkane, 2) a phosphate salt of an alkyl-monoamine and 3) a polyhydroxy alcohol.

SUMMARY OF THE INVENTION

Applicant has discovered an improved anti-icing additive for gasoline. The gasoline contains about 0.0001 to about 1.5% by weight of the reaction product of an N-secondary-alkyl trimethylene diamine (e.g. can contain an average of 10–20 carbon atoms in the alkyl group) and a phosphate ester obtained by reacting about 1-3 moles of polyphosphoric acid and about one mole of a condensation product of an alcohol (contains three to five carbon atoms) and 1–10 moles of an alkylene oxide, e.g. ethylene oxide.

DESCRIPTION OF THE INVENTION

Examples of useful phosphate esters include those found in U. S. Pat. No. 3,331,896 to Eiseman, Jr. et al. Particularly useful phosphate esters are obtained by reacting about 1 to about 3 moles of polyphosphoric acid and about 1 mole of a condensation product of an alcohol containing about three to about five carbon atoms and about 1 to 10 moles of an alkylene oxide containing about two to four carbon atoms (e.g. 1–10 moles of ethylene oxide).

Examples of N-secondary-alkyl trimethylene diamines are found in U. S. Pat. No. 3,398,196 to Fuller Jr. et al. The diamines can be represented by the formula:

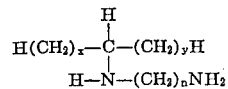

where $x$ and $y$ are positive integers having a sum of about 6 to about 30 and $n$ is a positive integer within the range of about 2 to about 4 and preferably is 3. The polyamines are preferably oleophilic and contain substantially saturated alkyl chains. Additional examples of diamines useful with this invention are found in "Product Data Bulletin," Bulletin No. 68–3, under the title "Beta Amines and Derivatives," Amour Industrial Chemicals, Box 1805, Chicago, Illinois.

A particularly useful N-secondary-alkyl trimethylene diamine is one wherein the alkyl group contains an average of about 10 to about 21 aliphatic carbon atoms.

The diamine and the phosphate ester are reacted in sufficient amounts to obtain a pH within the range of about 7 to about 9 and more preferably about 7 to about 8. A composition having a pH greater than about 7 has the advantage of imparting improved deicing characteristics to the fuel. A solvent for the reactants can be utilized during the neutralization to facilitate mixing of the diamine and the phosphate ester, e.g. isopropyl alcohol. Temperatures within the range of about 60°F. to about 100°F. are useful in the neutralization and more preferably the temperature is about 80°F. to about 90°F.

Reaction product of the diamine and the phosphate ester can be incorporated in the gasoline in amounts ranging from about 0.0001 to about 1.5 weight percent or more. Generally, concentrations within the range of about 5 to about 15 lbs. per 1000 barrels of gasoline stock are useful to obtain improved anti-icing characteristics. Other additives, including detergents, scavenging agents, etc. can be used with the compositions of this invention to impart desired characteristics to the fuel.

The products of this invention are tested in a carburetor icing testing apparatus which consists of a controlled temperature-humidity-pressure test chamber in which a specially designed carburetor is mounted. Manifold vacuum of an internal combustion engine is simulated by a vacuum pump. Gasoline is supplied under constant pressure and constant flow rate from an external feed tank under nitrogen pressure. The air to the test equipment is 42°F. and has a relative humidity of 93 percent. The rate of ice formation on the throttle plate within the carburetor is measured by the change in pressure drop across the throttle plate during five one-minute intervals. The sum of these changes during intervals is called the icing severity. The air:fuel ratio is 12:1, respectively. The compositions identified in Examples 1–6 are tested at a concentration of 10 lbs. per 1000 barrels of gasoline and the improvement of deicing characteristics is based on a gasoline without any deicing agent incorporated therein. That is, the treated gasoline as compared to an untreated gasoline shows a percent improvement calculated from the appropriate icing severity values. The untreated gasoline used for these tests as well as the basic gasoline with which the compositions are admixed with, has the following characteristics:

API Gravity = 59.8 at 60°F.
R.V.P. at 100°F. = 11 lbs.
ASTM Distillation Procedure = D86-67
IBP = 88°F (corrected to 760 mm)
5% = 109°F
10% = 124°F
20% = 154°F
30% = 179°F
40% = 205°F
50% = 228°F
60% = 253°F
70% = 278°F
80% = 305°F
90% = 349°F
95% = 385°F
E.P. = 406°F
Rec. = 97%
Res. = 1.0%
Loss = 2.0%

Nomenclature within the above is defined as follows: R.V.P. is the Reid Vapor Pressure, E.P. in the end point, Rec. is the percent recovery of the distillate and Res. is the residue left after distillation, the difference between the Rec. and Res. is the loss. The air is supplied from a rotary blower and is passed countercurrently with cold water in a packed bed cooler-humidifier and then injected into a water leg in the bottom of a plexiglass test chamber. This chamber is maintained at constant pressure by means of an air bleed valve on the air inlet line. After entering the chamber, the air comes in contact with the gasoline and then flows through the carburetor. The outlet line of the vacuum pump contains an orifice that permits measurements of the air flow rates. The water temperature in the test chamber in controlled by refrigeration unit.

The following examples teach how the compositions are obtained:

EXAMPLE I

A phosphate ester is obtained by reacting equal molar amounts of polyphosphoric acid and a condensation product of one mole of iso-amyl alcohol with 4.0 moles of ethylene oxide.

To a solution composed of equal volumes of isopropanol and Duomeen L-15 (a tradename of Armour Industrial Chemicals, Chicago, Illinois, identified as an N-secondary-alkyl trimethylene diamine wherein the alkyl group contains from about 15–20 carbon atoms), there is added at 90°F. and under mixing conditions enough of the above phosphate ester to neutralize the polyamine to a pH of 7.

EXAMPLE II

A phosphate ester is obtained by reacting equal molar amounts of polyphosphoric acid and the condensation product obtained by reacting one mole of n-butyl alcohol and 1 mole of ethylene oxide.

To a solution composed of equal volumes of Duomeen L-11 (a tradename of Armour Industrial Chemicals, Chicago, Illinois, identifying an N-secondary alkyl trimethylene diamine wherein the alkyl group contains from about 11–14 carbon atoms) and isopropyl alcohol, there is added at 80°F. sufficient amounts of the above phosphate ester to neutralize the diamine to a pH of 7.8. There is added 1.5 additional parts of isopropyl alcohol to the mixture.

EXAMPLE III

Example II is duplicated except the diamine is neutralized to a pH of 6.5.

EXAMPLE IV

To a solution containing equal volumes of the Duomeen L-11 isopropyl alcohol, there is added at 90°F. sufficient amounts of the phosphate ester identified within Example I to obtain a pH of 7.0.

EXAMPLE V

Example I is duplicated except the diamine is Duomeen L-18 (an N-secondary-alkyl trimethylene diamine wherein at least 90 percent of the alkyl groups contain about 18 carbon atoms).

EXAMPLE VI

Example I is duplicated except the phosphate ester is obtained by reacting equal molar amounts of polyphosphoric acid and a condensation product of iso-amyl alcohol and 5.2 moles of ethylene oxide.

Deicing Characteristics

The above compositions are tested in the above defined carburetor deicing testing apparatus and the following results are obtained:

| Example No. | Dosage (lbs/additive per 1000 barrels gasoline) | Carburetor Anti-Icing Rating* |
|---|---|---|
| 1 | 10 | 60.6 |
| 2 | 10 | 74.8 |
| 3 | 10 | 21.0 |
| 4 | 10 | 63.9 |
| 5 | 10 | 61.9 |
| 6 | 10 | 67.3 |

*Percent improvement over a gasoline without an anti-icing agent incorporated therein.

These above results indicate that the composition of this invention are effective as anti-icing agents. Example 3 indicates the pH criticality of the resulting phosphate ester/diamine composition, i.e. a pH of 6.5 gives a 21 percent anti-icing improvement whereas the same composition except neutralized to a pH of 7.8 gave an anti-icing percent improvement of 74.8.

These examples are presented to illustrate working embodiments of this invention. They are not intended to limit the invention in any way. Rather, all equivalents obvious to those skilled in the art are intended to be incorporated within the teachings of the invention as defined within the specification and appended claims.

What is claimed is:

1. An improved anti-icing gasoline composition comprising a major proportion of a hydrocarbon base fuel boiling in the gasoline boiling range and about 0.0001 to about 1.5 percent by weight of the product obtained by neutralizing to a pH of about 7 to about 9 a 1. diamine of the formula:

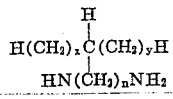

wherein $x$ and $y$ are positive integers having a sum of from about 6 to about 30 and $n$ is a positive integer within the range of from about 2 to about 4 with 2. a phosphate ester obtained by reacting about 1 to about 3 moles of polyphosphoric acid and about 1 mole of a condensation product of an alcohol containing about 3 to about 5 carbon atoms and from 1 to about 10 moles of an alkylene oxide.

2. The gasoline composition of claim 1 wherein the product is neutralized to a pH of about 7 to about 8.

3. The gasoline composition of claim 1 wherein the diamine is an N-secondary-alkyl trimethylene diamine.

4. The gasoline composition of claim 3 wherein the alkyl group contains an average of about 10 to about 20 carbon atoms.

5. The gasoline composition of claim 1 wherein the condensation product is obtained by reacting about one mole of the alcohol with about 1 to about 10 moles of ethylene oxide.

6. The gasoline composition of claim 1 wherein the diamine and phosphate ester are reacted at a temperature up to about 100°F.

7. The gasoline composition of claim 1 wherein the phosphate ester is obtained by reacting about equal molar amounts of the polyphosphoric acid and the condensation product.

8. An improved anti-icing gasoline composition comprising a major proportion of a hydrocarbon base fuel boiling in the gasoline boiling range and about 0.0001 to about 1.5 percent by weight of the product obtained by neutralizing to a pH of about 7 to about 9

1. a N-secondary-alkyl trimethylene diamine wherein the alkyl group contains an average of from about 10 to about 20 carbon atoms with 2. a phosphate ester obtained by reacting about equal molar amounts of polyphosphoric acid and the condensation product of about one mole of an alcohol containing about three to about five carbon atoms and about 1 to about 10 moles of an alkylene oxide.

9. The gasoline composition of claim 8 wherein the alcohol is iso-amyl.

10. The gasoline composition of claim 8 wherein the pH of the composition is about 7 to about 8.

11. The gasoline composition of claim 8 wherein the pH of the composition is about 8.

12. The gasoline composition of claim 8 wherein the alkylene oxide is ethylene oxide.

* * * * *

UNITED STATES PATENT OFFICE
CERTIFICATE OF CORRECTION

Patent No. 3,771,980  Dated November 13, 1973

Inventor(s) Arthur Lee Larsen

It is certified that error appears in the above-identified patent and that said Letters Patent are hereby corrected as shown below:

On the cover sheet item [75] should read as follows:

-- Arthur Lee Larsen --.

Signed and sealed this 30th day of April 1974.

(SEAL)
Attest:

EDWARD M. FLETCHER, JR.
Attesting Officer

C. MARSHALL DANN
Commissioner of Patents